Feb. 3, 1970          ROLF-DIETER KRANZ          3,493,795
TURBOGENERATOR WITH LIQUID-COOLED ROTOR-WINDING
Filed Nov. 6, 1967
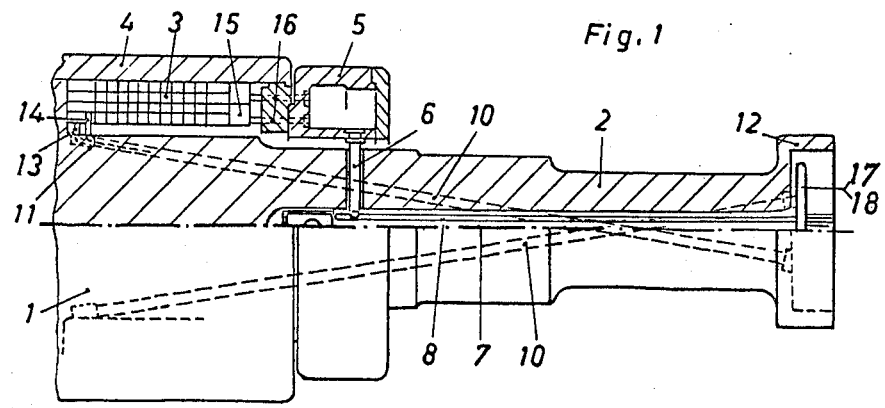
Fig. 1
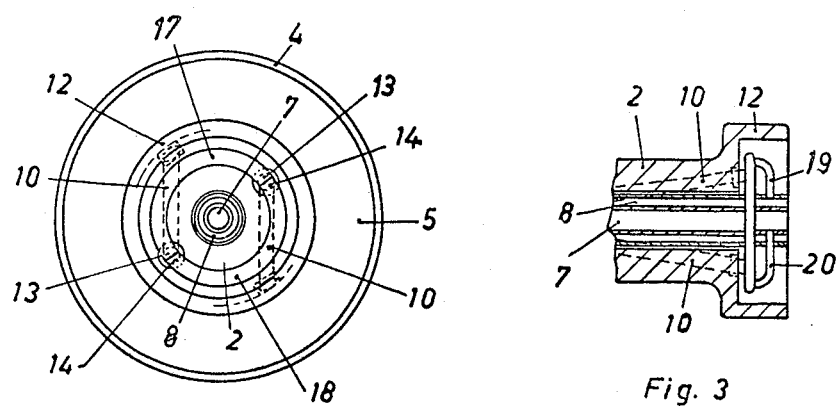
Fig. 2
Fig. 3
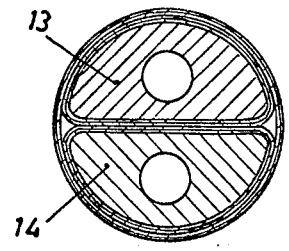
Fig. 4
Inventor
Rolf-Dieter Kranz
By Pierce, Scheffler & Parker
Attorneys

United States Patent Office 3,493,795
Patented Feb. 3, 1970

3,493,795
TURBOGENERATOR WITH LIQUID-COOLED ROTOR-WINDING
Rolf-Dieter Kranz, Baden, Switzerland, assignor to Aktiengesellschaft Brown, Boveri & Cie, Baden, Switzerland, a joint-stock company
Filed Nov. 6, 1967, Ser. No. 680,872
Claims priority, application Switzerland, Nov. 15, 1966, 16,403/66
Int. Cl. H02k 1/32, 3/22
U.S. Cl. 310—54      5 Claims

ABSTRACT OF THE DISCLOSURE

A rotor for a turbogenerator is provided with a liquid cooled excitation winding consisting of hollow conductors through which liquid coolant is circulated. The connection leads to this winding are constituted by bifilar hollow liquid cooled conductors located in bores in the non-driving end of the rotor shaft, the bores being straight and continuous and inclined to the axis of the rotor shaft, and the electrical and hydraulic connections at the opposite ends of these leads are made externally of the surface of the rotor body and the end of the rotor shaft, respectively.

---

With large electrical machines particularly turbogenerators, the equipment for transmitting current to the excitation winding of the rotor is generally located on the shaft beyond the bearing at the non-driving end of the machine so that it is more accessible. The leads for the excitation winding are arranged in a central bore in the shaft and connect the ends of the rotor winding inside the machine with the current transmission apparatus, for instance slip-rings, rotating diodes, a homopolar machine.

Such an arrangement can be used for gas-cooled rotors without any difficulty, but this is not the case when the machine has a liquid-cooled rotor where the leads for the excitation winding must also be cooled with a liquid. In the latter event, difficulties occur as regards insulation and sealing at the points where the direction of the leads changes from the axial direction to the radial direction, that is to say a 90° change in direction occurs. Another problem is the connection of the leads to the cooling liquid system.

In a known arrangement where the electrical leads for the excitation winding are located inside the shaft, these leads are partly arranged inside the pipes which serve for the transmission of the cooling liquid. Only a very limited space is, however, available inside the shaft for such an arrangement. Great difficulties occur however, in connection with the necessary insulation and seals and also as regards the hydraulic connections where an adequate insulation has to be provided for the liquid supply and discharge pipes which are normally in the form of concentric pipes located in a central bore in the shaft. Furthermore in this known arrangement, the leads are only cooled along a certain part of their length.

The present invention is directed to a turbogenerator with a liquid-cooled excitation winding and the object of the invention is to overcome the aforementioned difficulties hitherto encountered in connection with the cooling of the excitation winding leads by means of a liquid. This is achieved in accordance with the invention by using electrical leads in the form of hollow bifilar conductors which are located in straight continuous bores inside the non-driving end of the rotor shaft which are inclined with respect to the longitudinal axis of the shaft, the cooling liquid connections to the leads being arranged outside the shaft.

A constructional example according to the invention is now explained with reference to the drawing where FIG. 1 shows a view of the non-driving end of a rotor, partly in elevation and partly in longitudinal section, whilst FIG. 2 shows the end of the rotor in end elevation. FIGS. 3 and 4 show details of the arrangement in longitudinal section and cross-section respectively.

The constructional example in question shows a turbogenerator with a rotor winding having direct liquid cooling. In FIGS. 1 and 2 reference numeral 1 indicated the rotor body and numeral 2 the rotor shaft, the end turns of the water-cooled rotor winding which consist of hollow conductors are indicated by reference numeral 3. The end turns 3 are held in position by a retaining ring 4. An annular distribution chamber 5 for the cooling water is mounted on the end plate of the retaining ring 4 and this chamber is divided into a plurality of tangential compartments by means of radial separating walls, part of these compartments being used for supplying and the other part for discharging the cooling water. These compartments are connected by means of radial pipes 6 to concentric channels 7 and 8 located inside the rotor shaft, these channels serving to conduct the coolant to and from the machine.

Outside the central bore where the concentric channels 7, 8 are located, at least two further bores 10 are provided in the rotor shaft, these bores being inclined in opposite directions relative to the shaft axis and ending at the surface of the rotor shaft near to the active rotor body. This end of these bores is completely open by providing a small machined recess 11 in the surface of the rotor body. The other end of each of these bores extends into a coupling 12, only half of this coupling being shown in the drawing; this coupling 12 serves to obtain a mechanical and electrical connection between the rotor shaft and the current transmission device for example the slip rings. The leads for the rotor winding 3 are located in the bores 10 and consist of bifilar hollow conductors 13, 14 so as to avoid a magnetisation of the shaft. A bifilar conductor is illustrated in FIG. 4 in cross-section.

The semi-circular cross-section of conductors 13, 14 which are mutually insulated from each other, enables these conductors to be directly cooled with water. At the recess 11 where the conductors project outwards from the bores 10, they are bent into the radial direction and connected to a bar located between the conductors of the excitation winding 3, whereby an electrical connection is established with the latter. In the constructional example illustrated in the drawing, where the excitation winding is of the multilayer type, it is expedient to make this connection by means of a connecting element 15 which also serves as a hydraulic connection. Conductors 13, 14 are in communication by way of connecting pieces 15 and insulation elements 16 with the corresponding compartments of the distribution chamber 5, which as already mentioned, is connected by means of radial pipes 6 to the concentric axial supply and discharge channels 7, 8 respectively. Inside the half coupling 12, the conductors 13, 14 which have the same polarity are connected together hydraulically by means of semicircular straps 17, 18 located in suitable recesses. Leads 13, 14 are therefore cooled by way of a cooling water circuit which is connected to the compartments of distribution chamber 5. The electrical connections to the slip rings or other transmission elements can be located on the straps 17, 18.

Within the mechanical coupling halves 12, it is also possible to connect the hollow conductors 13, 14 by means of electrically insulated pipe lengths 19, 20 in a simple manner to the axial cooling liquid channels 7, 8 in the central bore of the rotor, as is shown in FIG. 3. The other end of the leads 13, 14 can be connected either to corresponding compartments of distribution chamber 15 or conductors 13, 14 of the same polarity located in different bores 10 are connected together hydraulically in which case the distribution chamber 5 is not used for cooling the leads.

By using the arrangement of the leads according to the invention, it is possible to avoid all screw connections or similar devices hitherto required inside the rotor shaft. When the cooling system of the leads is connected to that of the rotor winding, the same connections and insulation elements can be used as those provided for the connection of the rotor winding. There is adequate space available inside the coupling for the leads and connections.

I claim:

1. A liquid cooled rotor for a turbogenerator comprising a rotor body provided with an excitation winding of the hollow conductor type through which a liquid coolant is circulated, the shaft portion of said rotor body at its non-driving end being provided with straight continuous bores which are inclined with respect to the longitudinal axis of the rotor, one end of said inclined bores terminating at the surface of the rotor adjacent the end turn portion of said excitation winding and the other end of inclined said bores terminating at the non-driving end of the shaft, and bifilar hollow conductors located within said inclined bores, said bifilar conductors serving as the electrical connection leads to the hollow conductors of said excitation winding and also being traversed by a liquid coolant, the hydraulic and electrical connections to said hollow bifilar conductors being made at the opposite ends of said inclined bores at locations externally of the surface of the rotor body and rotor shaft, respectively.

2. A liquid cooled rotor for a turbogenerator as defined in claim 1 wherein said liquid cooled hollow bifilar conductors constituting said electrical connection leads to said excitation winding are connected into the cooling system provided for said excitation winding and wherein bifilar conductors of the same polarity are connected together hydraulically.

3. A liquid cooled rotor for a turbogenerator as defined in claim 1 wherein said shaft portion thereof adjacent the non-driving end of the rotor is provided with concentric axially extending supply and discharge channels correlated to the cooling system for said excitation winding, wherein the ends of said hollow bifilar conductors at the non-driving end of said rotor shaft are hydraulically connected to said supply and discharge channels by means of electrically insulated pipes, and wherein the opposite ends of said hollow bifilar conductors adjacent the surface of said rotor body at the end portion of said excitation winding are hydraulically connected into the liquid cooling system for said excitation winding.

4. A liquid cooled rotor for a turbogenerator as defined in claim 1 wherein said shaft portion thereof adjacent the non-driving end of the rotor is provided with concentric axially extending supply and discharge channels correlated to the liquid cooling system for said excitation winding, wherein the ends of said hollow bifilar conductors at the non-driving end of said rotor shaft are hydraulically connected to said supply and discharge channels by means of electrically insulated pipes, and wherein the opposite ends of those hollow bifilar conductors adjacent the surface of said rotor body at the end turn portion of said excitation winding which have the same polarity are connected together hydraulically.

5. A liquid cooled rotor for a turbogenerator as defined in claim 1 wherein two of said inclined bores are provided to carry said bifilar hollow conductors, said bores having opposite directions of inclination relative to the rotor axis.

References Cited

UNITED STATES PATENTS

| 3,131,321 | 4/1964 | Gibbs | 310—64 |
|---|---|---|---|
| 3,189,769 | 6/1965 | Willyoung | 310—54 |
| 3,353,043 | 11/1967 | Albright | 310—61 |
| 3,393,333 | 7/1968 | Kudlacik | 310—61 |

MILTON O. HIRSHFIELD, Primary Examiner

R. SKUDY, Assistant Examiner

U.S. Cl. X.R.

310—64